United States Patent
Onsager

[15] 3,671,568
[45] June 20, 1972

[54] PRODUCTION OF ADIPONITRILE

[72] Inventor: Olav Torgeir Onsager, Waldwick, N.J.

[73] Assignee: Halcon International, Inc.

[22] Filed: April 29, 1970

[21] Appl. No.: 33,043

[52] U.S. Cl. ..................260/465.8 D, 260/485, 260/537, 260/561, 260/593, 260/601
[51] Int. Cl. ..................................................C07c 121/26
[58] Field of Search..............260/465.8 R, 465.8 D, 485 R, 260/537 R, 593 R, 601 R, 561 K

[56] References Cited

UNITED STATES PATENTS

| | | | |
|---|---|---|---|
| 2,606,204 | 8/1952 | Hogsed et al. | 260/465.8 |
| 2,644,835 | 7/1953 | Ladd et al. | 260/465.8 UX |
| 2,956,075 | 10/1960 | Boffa et al. | 260/465.8 |
| 3,525,678 | 8/1970 | Kim et al. | 260/485 X |
| 3,562,181 | 2/1971 | Linn et al. | 260/465.8 UX |
| 3,574,702 | 4/1971 | Feldman et al. | 260/465.8 |
| 3,397,252 | 8/1968 | Jones | 260/465.8 X |
| 3,484,475 | 12/1969 | Cornforth et al. | 260/465.8 |
| 3,499,922 | 3/1970 | Feldman et al. | 260/465.8 |
| 3,375,237 | 3/1968 | Baizer | 260/465.8 X |
| 3,356,708 | 12/1967 | Davies et al. | 260/465.8 |

Primary Examiner—Joseph P. Brust
Attorney—William C. Long, David Dick and Michael I. Wolfson

[57] ABSTRACT

A process for the reductive coupling of a compound having the formula

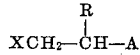

wherein X is Cl, Br, or I, R is H or lower alkyl, and A is —CN,

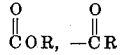

or —CONR$_2$, using as reducing agent a metal or a lower valent compound thereof in combination with a promoter salt. The invention especially relates to an overall process for the production of linear dimers of compounds of the formula

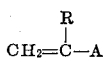

by first hydrohalogenation to

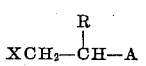

followed by the reductive coupling. The specific improvement of the present process is the provision of a nitrile solvent during the reductive coupling whereby improved coupling selectivities are achieved.

4 Claims, No Drawings

PRODUCTION OF ADIPONITRILE

BACKGROUND OF THE INVENTION

This invention relates to a process for the reductive coupling of particular halo organic compounds and in particular provides a process for the preparation of valuable compounds such as adiponitrile starting with inexpensive and readily available compounds such as acrylonitrile.

Adiponitrile is a chemical of very great potential importance since it is easily converted to hexamethylene diamine by straightforward procedures. Hexamethylene diamine is, of course, a component of nylon 6, 6.

Presently, the bulk of hexamethylene diamine is prepared by the costly route of first preparing adipic acid and subsequently converting the adipic acid to hexamethylene diamine. In view of the high expenses associated with the adipic acid route, those skilled in this art have devoted much time and energy to devising other, less costly routes.

Acrylonitrile has become a cheap and readily available chemical and great efforts have been expended in order to successfully prepare adiponitrile from acrylonitrile, via linear dimerization or hydrodimerization procedures. However, such methods have not proved completely successful since in linear dimerizations yields are very low and high amounts both of polymer and of the branched dimer tend also to be produced. In U.S. Pat. No. 3,225,083, for example, linear dimerizations are taught using aromatic tertiary phosphine catalysts but these produce at best only minor amounts of linear dimer. Hydrodimerizations produce better yields of adiponitrile but inevitably high amounts of propionitrile are also produced thus rendering the process as economically unattractive. For example, British Pat. No. 1,079,696 shows dimerization using a ruthenium catalyst with yields of linear products less than 50 percent based on consumed acrylonitrile.

Hydrodimerizations have also been taught using alkali metal amalgams. U.S. Pat. No. 3,215,726 seeks to provide an improvement by using beta-halopropionitrile in combination with acrylonitrile in the alkali metal amalgam system but still shows high production of propionitrile and poor yields of adiponitrile despite the use of expensive procedures and reagents. Electrolytic hydrodimerization procedures suffer from the problems inherent in electrolytic cell usage—proportional capital cost for increase capacity insofar as the electrolytic cells are concerned, and high power costs.

The extension of carbon chains by the reductive coupling of two groups is well known in the art. Organic coupling has been accomplished for example by the well known Wurtz reaction wherein an organic halide is coupled in the presence of metallic sodium. Similarly, organic halo compounds activated by groups such as allylic, benzylic, gem di-halides and 1,2 dihalides have been coupled.

For example, in British Pat. No. 858,514 the coupling of chloro substituted allylic cyano compounds is shown. However, the coupling of non-activated halo compounds is not shown.

The effect of dipolar aprotic solvents like dimethylformamide, dimethylsulfoxide and hexamethylphosphorictriamide on the coupling of allylic halides as well as on the reductive coupling of acrylonitrile is well known in the prior art. For example, the reductive coupling of acrylonitrile in the presence of beta-chloropropionitrile using alkali metal amalgams as coupling agents is performed in aqueous media (Asalic Glass Co. Ltd. Derwent Japanese 8, No. 18, general organic p. 5). Improved selectivities and efficiencies have been obtained for the electrolytic as well as for the reductive coupling of acrylonitrile to adiponitrile using alkali metal amalgam reducing agents by the use of aqueous dimethyl sulfoxide and dimethylformamide media (French Pat. Nos. 1,505,954 and 1,504,395). In British Pat. No. 1,117,677, comparative control examples clearly demonstrate the superior effect of this type of reaction media over, for example, acetonitrile.

RELATED APPLICATIONS

The present application is a continuation in part of copending application Ser. No. 801,757 filed Feb. 24, 1969, Ser. No. 801,758 filed Feb. 24, 1969, Ser. No. 835,722 filed June 23, 1969 and Ser. No. 872,395 filed Oct. 29, 1969.

SUMMARY OF THE INVENTION

In accordance with the present invention, an organic compound having the formula:

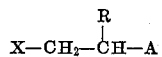

is coupled by reaction in the liquid phase at about 50-250° C. to produce the coupled product

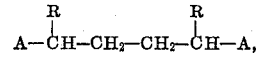

A being —CN,

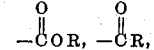

or —CONR$_2$, R being hydrogen or lower alkyl (1 to 4 carbon atoms), and X being chloro, bromo or iodo, the improvement of this invention being that the reaction is carried out in a nitrile solvent. In by far the most preferred embodiment, adiponitrile is prepared by the coupling of 3-halopropionitrile, especially 3-bromopropionitrile.

In a particular practice, the above coupled product is prepared from the unsaturated compound

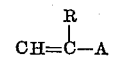

by the steps of reacting said unsaturated compound with HX to produce

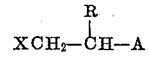

followed by the coupling of this latter product in the presence of the nitrile solvent. The compounds

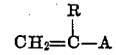

wherein R and A are as above indicated undergo anti-Markownikoff addition of HX and this is essential in order to produce the halo-organic product which is coupled to form the saturated linear derivative of the above said unsaturated material.

Although, the invention has wide applicability, in an especially advantageous practice there is provided a procedure for producing adiponitrile, i.e., N≡C—CH$_2$—CH$_2$—CH$_2$—CH$_2$—C≡N, from 3-halo propionitrile. It will, of course, be understood that the adiponitrile is readily converted to hexamethylene diamine by known techniques.

DETAILS OF THE INVENTION

A.—The halo organic compound

The halo organic compound has the formula

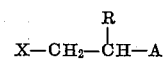

wherein X is chloro, bromo, or iodo, R is hydrogen or C$_1$—C$_4$ alkyl, and A is —CN,

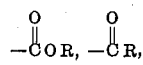

—CONR$_2$. Examples are 3-bromopropionitrile, 3-chloropropionitrile, 3-iodopropionitrile, 3-bromo-2-methyl propionitrile, 3-chloro-2-methyl propionitrile, 3-iodo-2-methyl propionitrile, 3-bromopropionic acid, 3-chloro-propionic acid, 3-iodo-propionic acid, 3-bromo methyl propionate, 3-chloro methyl propionate, 3-iodo methyl propionate, 3-bromo propionamide, 3-chloro propionamide, 3-iodo propionamide, methyl (2-bromoethyl) ketone, methyl (2-iodoethyl) ketone, methyl (2-chloroethyl) ketone.

B.—Preparation of the halo organic compound

The halo organic compounds which are coupled in accordance with the present invention, are most suitably prepared by hydrogen halide addition to the unsaturated precursor, i.e.,

wherein X, R and A are as above described. Of course, other methods are possible and could be used in carrying out the present invention.

The hydrogen halide addition is advantageously carried out by passing hydrogen halide into contact with liquid unsaturated precursor at moderate conditions, i.e., at 10–100° C. for example. The hydrogen halide may be liquid or vapor.

All vapor phase techniques can be employed but these are not preferred.

Catalysts such as described in U.S. Pat. 2,524,020, for example, can be employed.

Preferably, the gaseous hydrogen halide is passed into the liquid unsaturated compound until the addition reaction substantially ceases, e.g., 5 minutes to 10 hours, and thereafter the product beta halocompound

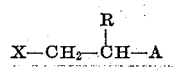

is recovered by straightforward distillation.

C. The Reducing Agent

The reductive coupling of the present invention is carried out in the presence of a coupling composition comprised of two essential component, i.e., a coupling agent selected from the group consisting of Cr, Mn, Fe, Co, Ni, Cu, Zn, Ag, Cd, In, Sn, Sb, Te, Hg, Tl, Pb, and Bi used either as the metal or as a zero valent compound of the metal such as the carbonyl preferably together with, as the second component, a promoting salt. Additionally, compounds of Cr, V and Ti where the Cr, V and Ti are in the lower valence state, i.e., $Cr^{+2}$, $V^{+2}$ and $Ti^{+2}$, can also be used as coupling agent.

The promoting salts are salts (preferably anhydrous), which have substantial solubility in the reaction system, e.g. at least to the extent of 0.1 percent by weight and preferably at least 1 percent by weight. The cation of the salt can be an ammonium, phosphomium, alkyl ammonium or alkyl phosphonium group but preferably is lithium, magnesium, titanium, vanadium, chromium, manganese, iron, cobalt, nickel, copper, zinc, aluminum, zirconium, niobium, molybdenum, ruthenium, rhodium, palladium, hafnium, tantalum, tungsten, rhenium, osmium, iridium and platinum. The anion of the salt is preferably a halogen such as bromine, iodine, or chlorine but also can be sulfate, nitrate, phosphate, borate, acetyl acetonate, oxide and the like. In fact, substantially any anion can be employed in order to provide adequate solubility to the promoting salt.

In general, the relative amounts of the coupling agent and promoting salt are in the range 0.01 to 100 parts by weight promoting salt per part of coupling agent, preferably 0.1 to 10 parts promoting salt per part of coupling agent and most desirably 1 to 5 parts promoting salt per part of coupling agent. The coupling agent can be added to the reaction together with the promoting salt, or alternatively the promoting salt can be generated in situ through reaction of a portion of the coupling metal or compound. It should be noted that in many instances during the course of the coupling reaction the coupling agent itself reacts to form further quantities of promoting salt. In the case of metallic iron, for example, during the reductive coupling the Fe reacts to form $FeX_2$, the latter being an effective promoting salt. It will thus be apparent that the ratio of coupling agent to promoting salt generally undergoes a continuous change during a batch reaction as the coupling agent is progressively reacted. The above described ratios of coupling agent and promoting salt refer to the ratios present in the reaction system during at least a predominance of the coupling of the halo-organic compound, i.e., during at least 50 percent of the coupling, preferably at least 70 percent and most desirably at least 90 percent of the coupling.

Insofar as the coupling agent is concerned, by far the most preferred practice of the invention involves the use of metallic iron, chromium, cobalt, nickel, silver or copper as the coupling agent. Iron, nickel and copper are most preferred. Still further, it is preferred but not essential that these be added in finely divided form, for example, as metal powder, although the metals in bulk form e.g., as sheets or large particles has also been found effective in the process of the invention. The metals can also be formed in situ as by decomposition of a precursor compound.

As will be seen from subsequent data, all coupling agents and promoting salts do not have equivalent utility. Various of the coupling agents have high activity and can be used with all of the promoting salts whereas some coupling agents are less active and should only be employed in combination with the more active promoting salts. For example, the more active coupling agents are chromium, manganese, iron, cobalt, nickel, zinc, cadmium, indium and tellurium as metals or zero valent compounds, or in the case of chromium also as $Cr^{+2}$ compounds. These coupling agents can be used with any of the listed promoting salts. The less active coupling agents are copper, silver, mercury, thallium, tin, lead, antimony, bismuth, titanium and vanadium as metals or zero valent compounds, or in the case of Ti and V as $Ti^{+2}$ or $V^{+2}$ compounds. These coupling agents should only be employed in combination with the more active promoting salts which are salts of lithium, magnesium, titanium, zirconium, vanadium, chromium, manganese, iron, cobalt, nickel and aluminum.

In appropriate practice of the present invention, mixtures of the coupling agents including alloys can be together with one or a mixture of the promoting salts.

The coupling agent and promoter is incorporated in the reaction system in sufficient amount to provide for the desired reductive coupling. By reductive coupling as used in the present specification and claims is meant a coupling of two molecules of the halo organic compound by the displacement of the halogens and the attachment of the carbons which contained these halogens to one another. Where a single halo organic compound is employed, the coupled product will represent a reduced dimer of the precursor of the halo organic compound. Where a mixture of different halo organic compounds is employed the coupled product will represent a mixture of dimers of the precursors of each of the halo compounds as well as co-dimers.

D. Effect of Solvent

Essential to the practice of the present invention is the presence in the coupling reaction, of a nitrile such as propionitrile, acetonitrile, or benzonitrile as solvent. It has surprisingly been found that the nitrile solvent exerts a unique effect when employed in certain concentrations whereby the selectivity of the coupling reaction is remarkably enhanced. For example, when the effect of the nitrile on the coupling selectivity is compared with the results obtained using equivalent amounts of other closely related solvents, the truly remarkable effect of nitrile is readily ascertained.

In accordance with the present invention, the reductive coupling reaction is carried out in a reaction mixture containing 10 to 90 percent by weight of solvent exclusive of the coupling composition. Most desirably, the reaction is carried out employing 25 to 70 percent by weight of nitrile solvent.

As a supplemental advantage, especially where the halo organic compound is halo propionitrile, a certain amount of propionitrile is formed as a result of inefficiencies in the coupling reaction. In preferred and desirable practices of the invention, such formed propionitrile can be recovered and employed in the coupling reaction. Propionitrile can be considered as indigenous to systems involving coupling of halo propionitrile thus minimizing the expense while at the same time providing the greatest possible coupling selectivity, and in such cases propionitrile is the preferred solvent.

Other nitrile solvents which can suitably be employed include acetonitrile, benzonitrile, glutaronitrile, malononitrile, butyronitrile, adiponitrile and caprinitrile.

E. Coupling Reaction Conditions

The reductive coupling is carried out in liquid phase with the total system pressure being sufficient to maintain the liquid phase, e.g., 0.1 to about 4,000 atmospheres, preferably 1 to about 100 atmospheres. Preferably oxygen is excluded and an inert atmosphere is employed, e.g., $N_2$, argon, $CO_2$, helium or the like. With carbonyl compound catalysts, however, a CO atmosphere is preferred.

The reaction temperature can range from 50° to 250°C. desirably from 80° to 200°C. and preferably from 100° to 175°C. The reaction time is sufficient to achieve the desired conversion and suitable reaction times range from 1 minute to about 50 hours, desirably 30 minutes to 40 hours, and preferably 2 to 20 hours.

In an especially preferred practice of the invention, the precursor which, upon addition of hydrogen halide, forms the functionally substituted halo-organic compound is incorporated in the reaction system.

For example, in the case of 3-halopropionitrile, it is advantageous to incorporate acrylonitrile in the reaction system to reduce propionitrile make.

Suitable mixtures for accomplishing the reductive coupling may have the following illustrative composition by weight on a coupling composition free basis:

|  | Broad | Desired | Preferred |
| --- | --- | --- | --- |
| Halo organic compound | 10–90% | 15–80% | 25–70% |
| Halo organic compound precursor | 0–80% | 2–70% | 5–50% |
| Propionitrile (Solvent) | 10–90% | 15–80% | 25–70% |

Where the unsaturated precursor of the halo organic compound is employed in the reaction mixture, it is frequently advantageous to employ polymerization inhibitors in order to prevent polymer formation. These inhibitors do not interfere with the coupling reactions and do effectively suppress the formation of polymer. Illustratively, the inhibitors are used in amounts ranging from about 0.01 to 10 percent by weight based on said unsaturated precursor. Specific examples of inhibitors include hydroquinone, methylene blue, p-nitrosodimethyl aniline, methoxyphenol, di-t-butyl para cresol, and the like.

F. Product Mixture Separation

The coupling reaction can be carried out in accordance with continuous or batch procedures.

In batch procedures, the reagents are charged to the reaction zone and the reagent mixture is heated to reaction temperature for the desired reaction time.

In continuous procedures one or a series of zones can be employed maintained at essentially steady state reaction conditions. Reagents are continuously added and reaction mixture continuously withdrawn.

In each of the above procedures, the reaction mixture contains the coupled product, i.e., the reacted coupling agent in the form of the halide, e.g., $FeX_2$ or $NiX_2$, $Cu_2X_2$ solvent, as well as the promoting salt unreacted halocompound and/or coupling agent, the unsaturated halo-compound precursor, as well as a small amount of by-product.

In one suitable operation, the reaction mixture is resolved by fractional distillation. The organic components are separated one from the other by fractional distillation in one or a series of columns. Since the reaction mixture contains the coupling agent in the form of the halide and may contain some polymer, scraped surface vacuum apparatus are appropriate for separating volatiles from solids in the reaction mixture. The solids can be discarded or can be worked by known procedures for the recovery of coupling agent and halide values.

In another suitable operation, the reaction mixture can be resolved by extraction and distillation procedures. For example, the reaction mixture can be contacted with water and the resulting mixture phase separated into an organic phase containing the bulk of the organic constituents and an aqueous phase containing the reacted coupling agent and promoting salt. The aqueous phase will contain some organics and these can be recovered by stripping and/or extraction as with benzonitrile or the like solvent. The salts are recovered by conventional procedures and the reacted coupling agent can be converted to HX and coupling agent by known procedures. The organics are readily resolved by fractional distillation.

Other techniques will be apparent and can be employed.

EXAMPLE 1

PREPARATION OF 3-BROMOPROPIONITRILE

Acrylonitrile (2,800 gms.) is charged to a 5 liter 3 necked flask equipped with a stirrer, condenser and a gas inlet tube. Anhydrous hydrogen bromide is fed into the acrylonitrile, with external cooling, at a fast enough rate so as to maintain a temperature of 15° to 25°C. Hydrogen bromide absorption ceases after about 3 hours. The solution is then distilled through a 20 plate 1 in. Oldershaw column at a reflux ratio of 3/1, 10 mm Hg. The product cut distills at 75°–76°C., and 3-bromopropionitrile product is recovered in 96 percent yield.

EXAMPLE 1a 125 g 3-bromopropionitrile, 12.5 g acrylonitrile (containing 0.1g hydroquinone), 188 g benzonitrile, 59 g copper powder and 12.5 g ferrous bromide are charged into a 1,000 cc glass autoclave under nitrogen flush. The autoclave is then pressurized with 50 psig nitrogen and heated with agitation for 6 hours at 160°C. After cooling to room temperature 150 cc of 2 percent HBr in water and 100 cc 3-bromopropionitrile are added and the mixture is agitated for 0.5 hours. The mixture is filtered to recover unreacted copper which is washed with 3-bromopropionitrile and water. The filtrate and the washings are combined and the resulting mixture is separated into aqueous and organic phase. The aqueous phase is extracted 3 times with benzonitrile and the extracts combined with the organic phase. Essentially all ferrous bromide is in the water phase, while the bulk part of the cuprous bromide formed during the coupling reaction is in the organic phase.

The conversion of copper is 63 percent. The organic phase is stripped to residue in a rotary-evaporator at 2 mm Hg pressure at an end stripping temperature of 220°C. The residue is found by analysis to contain cuprous bromide and a small part of organic by-products. A portion of the overhead is analyzed by g.l.c. for reaction products. Another portion is fractionated through a Vigreaux column at reduced pressure. Pure adiponitrile is recovered at a head temperature of 136°–140°C. and 2 mm Hg pressure.

The in-hand yield of adiponitrile is 97 percent of the amount found by g.l.c. analysis.

The yield of adiponitrile based on converted copper is 75 mol percent. From carbon analysis of distillation residue and by-product analysis the selectivity to adiponitrile based on converted 3-bromopropionitrile is 84 percent.

EXAMPLE 1b

The experimental procedure described in example 1a is repeated using 188 g of propionitrile instead of 188 g of benzonitrile as the solvent.

The yield of adiponitrile based on converted copper is 80 mol percent. From carbon analysis of distillation residue and by-product analysis the selectivity to adiponitrile based on converted 3-bromopropionitrile is 92 percent.

EXAMPLE 2

A series of comparative coupling runs are made using the following general procedure:

To a 500 cc glass autoclave equipped with a stirrer, condenser, pressure regulator and temperature controller is charged 59.0 grams copper powder, 25.0 grams ferrous bromide, 6.3 grams acrylonitrile (containing 0.1 percent hydroquinone) and the amounts of 3-bromopropionitrile (3BrPrN) and propionitrile (solvent) (PrN) as indicated in table I. The reactor is purged with nitrogen and pressurized to a pressure of 100 psig which is maintained during the course of the reaction.

The reaction mixture is then heated to 160°C. and the reaction temperature maintained at 160° ± 2°C. for 3 hours. The reaction is stopped by cooling the effluent to room temperature. The reaction mixture is analyzed for unconverted 3-bromopropionitrile and the amount of adiponitrile (ADN) formed (high temperature gas chromatography), the amount of cuprous bromide (converted reducing agent) and unconverted copper powder. From the analytical data the selectivity to adiponitrile based on converted 3-bromopropionitrile and the efficiency of the coupling composition are calculated. The results are summarized in table I.

TABLE I

| Run No. | 3-BrPrN | PrN | Selectivity to ADN, % | Coupling Agent Efficiency to ADN, % |
|---|---|---|---|---|
| 1 | 220 | 10 | 72 | 63 |
| 2 | 200 | 30 | 78 | 66 |
| 3 | 180 | 50 | 82 | 70 |
| 4 | 130 | 100 | 85 | 75 |

The results clearly demonstrate that improved selectivities are obtained using propionitrile as solvent at a level higher than 10 percent, calculated on coupling composition free basis.

EXAMPLE 3

A series of comparative coupling runs are made using the following general procedure:

To a 500 cc glass autoclave equipped with a stirrer, condenser, pressure regulator and temperature controller is charged 59.0 grams copper powder, 25.0 grams ferrous bromide, 125.0 grams 3-bromopropionitrile, 6.3 grams acrylonitrile (containing 0.1 percent hydroquinone) and 100 grams of a solvent as indicated in table II. The reactor is purged with nitrogen and pressurized to a pressure of 100 psig which is maintained during the course of the reaction.

The reaction mixture is then heated to 160°C. and the reaction temperature maintained at 160° ± 2°C. for 3 hours. The reaction is stopped by cooling the effluent to room temperature. The reaction mixture is analyzed for unconverted 3-bromopropionitrile and the amount of adiponitrile formed (high temperature gas chromatography), the amount of cuprous bromide (converted reducing agent) and unconverted copper powder. From the analytical data the selectivity to adiponitrile based on converted 3-bromopropionitrile and the efficiency of the coupling composition are calculated. The results are summarized in table II:

TABLE II

| Run | Solvent | Selectivity to Adiponitrile, % | Coupling Agent Efficiency to Adiponitrile |
|---|---|---|---|
| 1 | Propionitrile | 86 | 75 |
| 2 | Acetonitrile | 84 | 72 |
| 3 | Benzonitrile | 81 | 70 |
| 4 | N-dimethylformamide | 21 | 17 |
| 5 | N-methylpyrrolidone | 18 | 14 |
| 6 | Water | ≈0 | ≈0 |
| 7 | No solvent | 70 | 65 |

The results clearly demonstrate the superior effect of propionitrile, benzonitrile and acetonitrile as solvents in the reductive coupling reaction of 3-bromopropionitrile to adiponitrile. Similar results were also obtained when 3-chloropropionitrile or 3-bromoethylpropionitrile were used as substrate instead of 3-bromopropionitrile. Also by the use of other coupling compositions e.g.,

- metallic nickel + ferrous bromide,
- metallic nickel + nickel bromide,
- metallic nickel + nickel iodide,
- metallic nickel + carbon monoxide,
- metallic cobalt + ferrous bromide,
- metallic chromium + chromium bromide or
- metallic iron + ferrous chloride instead of the one described, superior results were obtained using propionitrile as solvent compared with runs where other dipolar aprotic solvents (N-dimethylformamide, N-methylpyrolidone etc.) were employed.

Solvents employed in this investigation were commercially available reagent grade materials. They were dried with $CaSO_4$, distilled through a 2 foot vacuum-jacketed Vigreux column and substantially prevented from absorbing atmospheric moisture during storage and handling.

What I claim:

1. In the process of producing adiponitrile by coupling 3-chloropropionitrile, 3-bromopropionitrile or 3-iodopropionitrile in the liquid phase at 50° to 250°C. in contact with a coupling agent, the improvement which comprises carrying out the coupling reaction in a reaction mixture containing 10 to 90 percent by weight nitrile solvent exclusive of the coupling agent and also exclusive of the
   - 3-chloropropionitrile,
   - 3-bromopropionitrile or
   - 3-iodopropionitrile reactant.

2. The process of claim 1 wherein the solvent is propionitrile.

3. The process of claim 1 wherein the solvent is acetonitrile.

4. The process of claim 1 wherein the solvent is benzonitrile.

* * * * *